(No Model.) 3 Sheets—Sheet 1.
G. F. GROTZ.
MACHINE FOR CUTTING KEYWAYS.
No. 489,304. Patented Jan. 3, 1893.
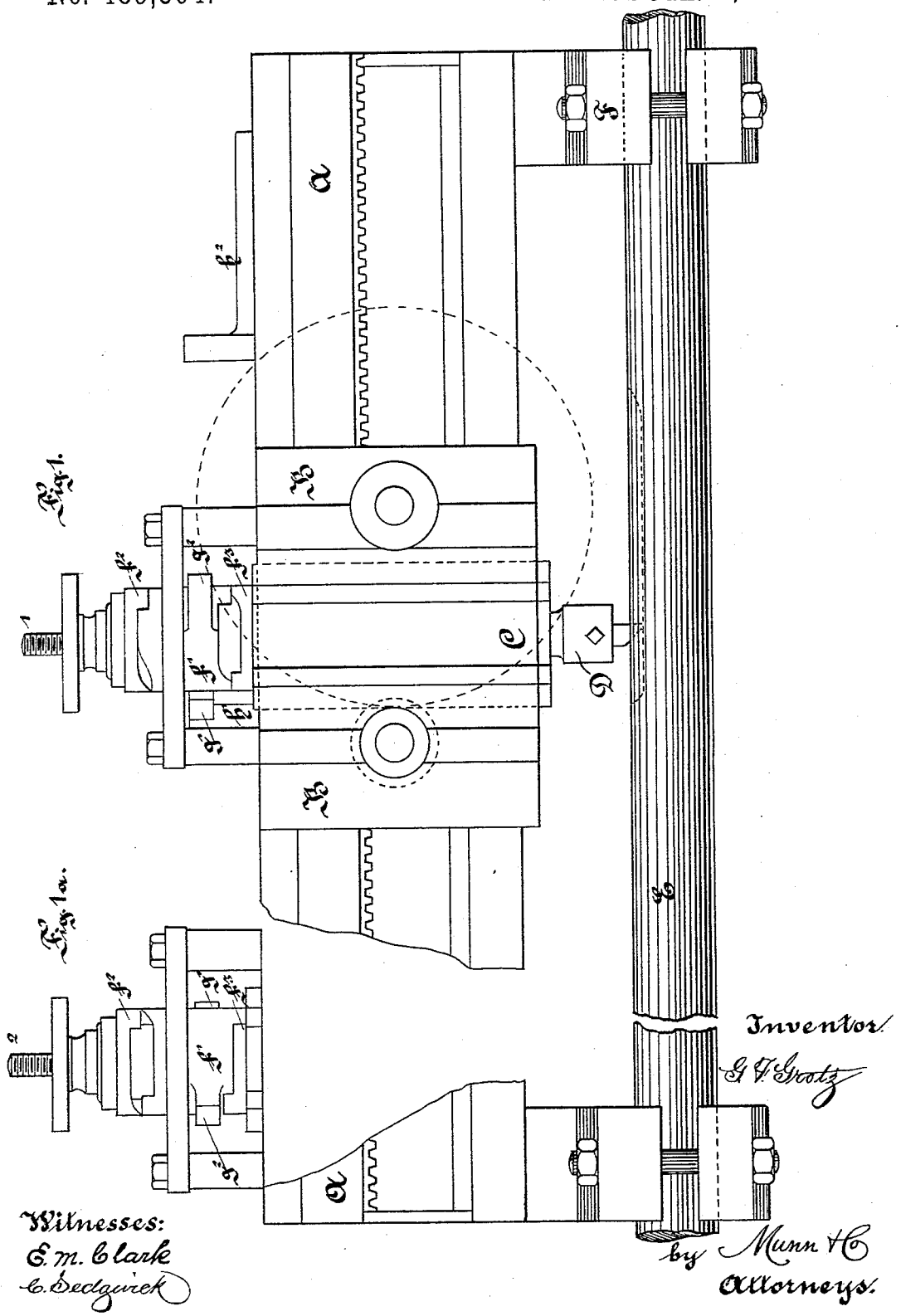
Witnesses:
E. M. Clark
C. Sedgwick
Inventor
G. F. Grotz
by Munn & Co.
Attorneys.

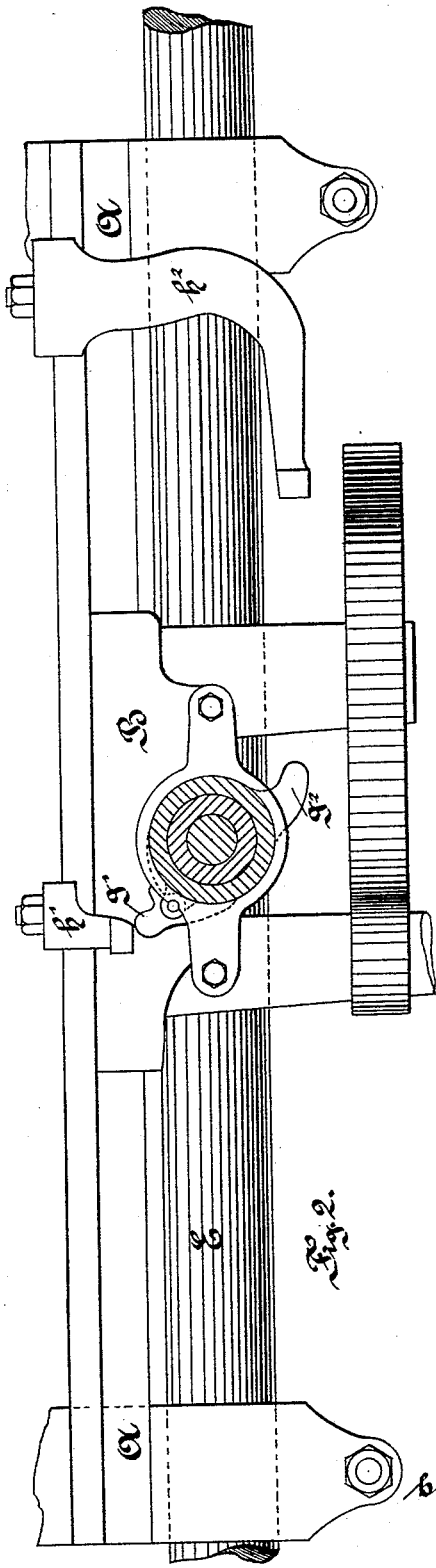

(No Model.)  3 Sheets—Sheet 3.
G. F. GROTZ.
MACHINE FOR CUTTING KEYWAYS.
No. 489,304. Patented Jan. 3, 1893.
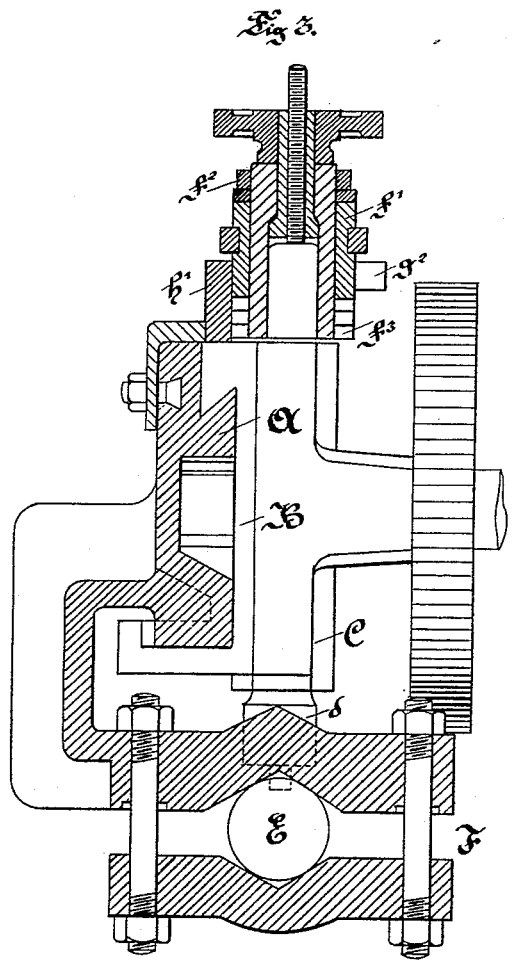
Witnesses:
E. M. Clark
C. Sedgwick
Inventor
G. F. Grotz
by Munn & Co.
Attorneys.

UNITED STATES PATENT OFFICE.

GOTTLOB FRIEDRICH GROTZ, OF BISSINGEN, WÜRTEMBERG, GERMANY.

MACHINE FOR CUTTING KEYWAYS.

SPECIFICATION forming part of Letters Patent No. 489,304, dated January 3, 1893.

Application filed May 31, 1892. Serial No. 434,978. (No model.)

*To all whom it may concern:*

Be it known that I, GOTTLOB FRIEDRICH GROTZ, of Bissingen, in the Kingdom of Würtemberg and German Empire, have invented a new and useful Machine for Cutting Keyways and Similar Slots, of which the following is a specification, reference being had therein to the accompanying drawings.

This invention relates to machines for cutting keyways and similar slots. In a machine constructed to embody these improvements the tool is held by a tool holder attached to a vertically movable slide contained within a longitudinally movable slide or carriage, the latter slide being operated by a rack and pinion or other suitable device the slot being cut during this longitudinal movement of the carriage. The vertical slide which holds the tool is alternately raised and lowered during the operation of the machine by two fixed trips engaging with a suitable cam, thus lowering the tool into the slot at the commencement of the stroke and raising it at its conclusion.

I will more particularly describe my said invention with reference to the accompanying drawings in which—

Figure 1 is an elevation of the machine in position for cutting a key way in the middle of a shaft; showing the vertical slide in the lowered position. Fig. 1ª is a detail view showing in elevation, the tool raising cams in the raised position; Fig. 2 is a sectional plan; and Fig. 3 a cross section.

The longitudinally movable carriage B which is moved along the bed of the machine A, by means of a rack and pinion or by other suitable means, is furnished with a vertical slide C the lower end of which carries a chuck or tool holder. At the commencement of working, the slide C and its tool holder and tool are automatically moved downward, the tool $s$ cutting into the shaft or other part E to be operated upon. The tool commences to cut the slot at a slight angle, continues for some distance parallel with the axis of the shaft, and finally rises and leaves the slot at about the same angle as that with which it commenced. The automatic rising and falling of the slide C and its tool holder D is effected by the circular cam $f'$ which is mounted so as to be capable of partial rotation in a bridge secured to the laterally moving slide B. At the top and bottom respectively of $f'$ and secured to the slide C are two similar cams $f^2$ and $f^3$. As the slide B is moved alternately to and fro along the bed A of the machine two lateral lugs or projections $g'$ $g''$ engage alternately and respectively with the two adjustably fixed stops or trip arms $h'$ $h''$. A quarter revolution is thus imparted to $f'$ upon the one movement of the slide B, by reason of the lug $g'$ engaging with the trip $h'$ and a quarter revolution in the reverse direction when the anchor $g''$ engages with the trip $h''$ upon the return movement of the slide B. These partial revolutions of the cam $f'$ cause the corresponding cams $f''$ $f^3$ to rise and fall, together with the slide C to which they are attached.

Fig. 1 illustrates the positions of the cams when the slide C is lowered, while Fig. 1ª shows the positions of the cams with the slide raised.

In order to prevent the cam $f'$ being turned at the wrong part of the stroke when repassing either of the trips, the projection $g'$ or both the projections may be arranged in the form of a spring latch so as to move past the stops during the backward motion of the slide.

The two stops $h'$ and $h''$ are adjustable upon the bed so that they can be set any desired distance apart, to regulate the length of the key way or slot.

The frame A of the machine is provided below the carriage, with suitable clamps F, which serve to hold the shaft E in the plane of the tool.

Having now particularly described and ascertained the nature of my said invention and in what manner the same is to be performed, I declare that what I claim is,—

1. The combination in a slotting machine, of a longitudinally sliding carriage, a support for the work, a vertical tool holding slide adapted for vertical movement in or on the carriage, and trips in the path of the carriage adapted to strike and actuate devices on the carriage that lower and raise the said slide to and from the work, substantially as described.

2. The combination in a slotting machine, of a traveling carriage, means for supporting the work, a tool holding slide carried by the carriage and adapted for vertical movement therein or thereon, cams for raising and lowering the slide, and means, substantially as described, for changing the relative position of the cams.

3. In a slotting machine, the combination of a carriage, a tool holding slide adapted for vertical movement in or on the carriage, opposite cam faces on the slide, an interposed cam, and trips for shifting said cam, substantially as described.

4. In a slotting machine, the combination of a carriage, a tool holding slide adapted for vertical movement thereon or therein, opposite cam faces on the slide, an interposed cam, and adjustable trips for the cam, substantially as described.

5. In a slotting machine, the following elements in combination, to wit;—a carriage, a work support below the carriage, a tool-holding slide adapted for vertical movement in or on the carriage, cams for raising or lowering the slide, and means for shifting the cams, the said cams acting to gradually project the tool carried by the plane of the tool supports, for causing the tool to stand and leave the slot at an angle, substantially as described.

In witness whereof I have hereunto set my hand in presence of two witnesses.

GOTTLOB FRIEDRICH GROTZ.

Witnesses:
PAUL FISCHER,
PAUL BRINKMANN.